US006907502B2

United States Patent
Augsburg et al.

(10) Patent No.: US 6,907,502 B2
(45) Date of Patent: Jun. 14, 2005

(54) METHOD FOR MOVING SNOOP PUSHES TO THE FRONT OF A REQUEST QUEUE

(75) Inventors: Victor Roberts Augsburg, Cary, NC (US); James Norris Dieffenderfer, Apex, NC (US); Bernard Charles Drerup, Austin, TX (US); Jaya Prakash Subramaniam Ganasan, Youngsville, NC (US); Richard Gerard Hofmann, Apex, NC (US); Thomas Andrew Sartorius, Raleigh, NC (US); Thomas Philip Speier, Holly Springs, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 10/264,169

(22) Filed: Oct. 3, 2002

(65) Prior Publication Data

US 2004/0068623 A1 Apr. 8, 2004

(51) Int. Cl.[7] .............................................. G06F 12/00
(52) U.S. Cl. ........................ 711/146; 711/113; 711/118; 711/151; 711/154; 711/158; 710/54; 710/310
(58) Field of Search ................................. 711/146, 113, 711/118, 151, 154, 158; 710/54, 310

(56) References Cited

U.S. PATENT DOCUMENTS

| | | | | |
|---|---|---|---|---|
| 5,611,058 A | * | 3/1997 | Moore et al. ................ | 710/311 |
| 5,617,556 A | * | 4/1997 | Baumgartner et al. ...... | 711/141 |
| 5,897,655 A | * | 4/1999 | Mallick ....................... | 711/134 |
| 5,930,485 A | * | 7/1999 | Kelly .......................... | 710/112 |
| 5,933,612 A | * | 8/1999 | Kelly et al. .................. | 710/311 |
| 5,970,512 A | * | 10/1999 | Martens et al. ............. | 711/205 |
| 5,996,036 A | * | 11/1999 | Kelly .......................... | 710/110 |
| 6,000,012 A | * | 12/1999 | Freerksen et al. .......... | 711/118 |
| 6,457,085 B1 | * | 9/2002 | Reddy ......................... | 710/305 |
| RE38,428 E | * | 2/2004 | Kelly et al. .................. | 710/110 |
| 6,725,307 B1 | * | 4/2004 | Alvarez et al. ............. | 710/110 |

* cited by examiner

*Primary Examiner*—Stephen Elmore
(74) *Attorney, Agent, or Firm*—Robert M. Carwell; Dillon & Yudell LLP (57) ABSTRACT

A method for prioritizing snoop pushes in a data processing system that schedules requests within a request FIFO. Each new request that is received is placed in the last position of the request FIFO and the request FIFO typically grants request based solely on the order within the request FIFO. As prior requests are sequentially granted the subsequent requests move closer to a first position of the request FIFO. However, when a snoop push is received at the request FIFO, the snoop push is automatically inserted at the first position of the request FIFO ahead of all yet to be granted requests within the request FIFO.

27 Claims, 8 Drawing Sheets

METHOD FOR MOVING SNOOP PUSHES TO THE FRONT OF A REQUEST QUEUE

CROSS-REFERENCE TO RELATED APPLICATIONS

The present application shares specification text and figures with the following co-pending application, which was filed concurrently with the present application: application Ser. No. 10/264,170 "Reordering Of Requests Between An Initiator And The Request Queue Of A Bus Controller."

BACKGROUND OF THE INVENTION

1. Technical Field

The present invention relates generally to computer systems and in particular to a computer system designed as a system on a chip (SoC). Still more particularly, the present invention relates to a method and system for manipulating the placement of snoop pushes within a request FIFO of a SoC.

2. Description of the Related Art

The computer industry has made significant developments in integrated circuit (IC) technology in recent years. For example, ASIC (application specific integrated circuit) technology has evolved from a chip-set philosophy to an embedded core based system-on-a-chip (SoC) concept. The system-on-a-chip concept refers to a system in which, ideally, all the necessary integrated circuits are fabricated on a single die or substrate. An SoC IC includes various reusable functional blocks, such as microprocessors, interfaces (e.g., external bus interface), memory arrays, and DSPs (digital signal processors). Such pre-designed functional blocks are commonly called "cores".

With a SoC, processed requests are sent from a core referred to as an initiator to a target (which may also be a core). An initiator (or master or busmaster as it is sometimes called) is any device capable of generating a request and placing that request on the bus to be transmitted to a target. Thus, for example, either a processor or DMA controller may be an initiator.

Targets (or slaves) are the receiving component that receives the initiator-issued requests and responds according to set protocols. A request is sometimes broadcasted to multiple targets, but based on some of the attributes of the request (such as the address), only one target "claims" the request and responds.

In order to complete the connections between initiators and targets, the SoC includes an on-chip bus utilized to connect multiple initiators and targets. The system bus consists of an interface to the caching-initiators and a separate interface to the targets and logic between the interfaces. The logic between the interfaces is called a "bus controller". This configuration is typical among system-on-a-chip (SoC) buses, where all the initiators, targets and the bus controller are on the same chip (die). In current systems, this bus is referred to as processor local bus (PLB) and has associated logic, PLB Macro. The "PLB Macro" is a block of logic that acts as the bus controller, interconnecting all the devices (i.e., initiators and targets) of the SoC.

Some initiators, called "caching-initiators", internally cache copies of the contents stored in the targets. The requests made by initiators may be "snoopable" or "non-snoopable". Non-snoopable requests are delivered to one or more targets. Snoopable requests are delivered to one or more targets and are also broadcast to all the caching-initiators via the "snoop" bus. A "snooper" is the portion of a caching-initiator that attaches to the snoop bus. All "snoopers" provide a response to snoopable requests.

A caching-initiator includes a cache for holding duplicate contents of a target (memory), a request-port for initiating requests and a snoop-port for snooping the contents of the cache when other initiators access the targets. Occasionally, the caching-initiator includes a "modified" state, as a part of a cache coherency protocol such as MESI, MEI or MOESI. The "modified" state indicates that the line (associated segment of data) has been written to a new value, but the new value has not yet been copied to the target. When the caching-initiators snoop a request on the snoop-port that hits a dirty (modified) location in the initiator's cache, the caching-initiator retries the request and makes a snoop-push request on its request-port. This causes the new value to be copied to the target before the request is allowed to proceed.

If the caching-initiator has one or more requests pending and subsequently encounters a request on its snoop-port that causes the initiator to make a snoop-push, it is often necessary for the snoop-push to be granted on the system bus before the requests that were already pending from that caching-initiator. This is because the already pending requests may also require other caching-initiators to make snoop-pushes. In a system with more than one caching-initiator, these completion dependencies may result in a deadlock. Also, for performance reasons, it is desirable for a caching-initiator to complete its snoop-pushes as quickly as possible. Presently, however a snoop-push is placed within the FIFO and is forced to sit in the FIFO until all requests ahead of the snoop-push have issued. There is currently no way to ensure that the snoop-push operation is completed out-of-order with respect to the requests already in the request FIFO.

Also, to improve performance and minimize logic area, the request FIFO must be able to contain multiple snoop pushes without including additional request storage separate from the FIFO.

The present invention recognizes that it would be desirable to provide a method and system for dynamically and immediately executing snoop-push operations to a bus controller for completion. A system and method that enables a snoop-push operation to be placed ahead of previously issued requests within a request FIFO to prevent system deadlock while waiting for the snoop-push to complete would be a great improvement. These and other benefits are provided by the invention described herein.

SUMMARY OF THE INVENTION

Disclosed is a method for prioritizing snoop pushes in a data processing system that schedules requests within a request FIFO. Each new request that is received is placed in the last position of the request FIFO and the request FIFO typically grants request based solely on the order within the request FIFO. As prior requests are sequentially granted the subsequent requests move closer to a first position of the request FIFO. However, when a snoop push is received at the request FIFO, the snoop push is automatically inserted at the first position of the request FIFO ahead of all yet to be granted requests within the request FIFO.

In one embodiment, the logic of the request FIFO temporarily suspends a grant of the next request scheduled to be granted and moves each request back one spot within the request FIFO. The snoop push is then inserted into the spot vacated by said next request, and normal operation of the request FIFO is resumed.

Also, a snoop push register is provided to temporarily hold the snoop push. With the snoop push register, one of two different implementations may be completed with the request FIFO. The first implementation holds the snoop push in the snoop push register until the move operation completes. In the second implementation, however, no move of requests within the request FIFO is required. The first position of the FIFO is occupied by a request, which is assumed to be already granted. The snoop push is held in the register until that request completes. Once the request completes, it is removed from the request FIFO, and the snoop push is inserted into the first position instead of the next request. Also, if a retry is received in response to the request, the logic of the request FIFO may re-order the request to a later time and place the snoop push in its place.

According to one other embodiment, if a next snoop push is received before the first snoop push inserted in the request FIFO is granted, the next snoop push is inserted sequentially after the first snoop push in the request FIFO.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides a novel method and system for handling snoop-push requests issued while there are other requests pending in the request FIFO of a caching-initiator. According to the illustrative embodiment, the snoop-push requests are forced to the top of a request FIFO that is populated with previously issued requests. The invention is implemented in computer systems that consist of at least one caching-initiator and target devices that transfer data between each other over a system bus. The system bus consists of an interface to the caching-initiators and a separate interface to the targets and logic between the interfaces. The logic between the interfaces is called a "bus controller".

Figure 1:
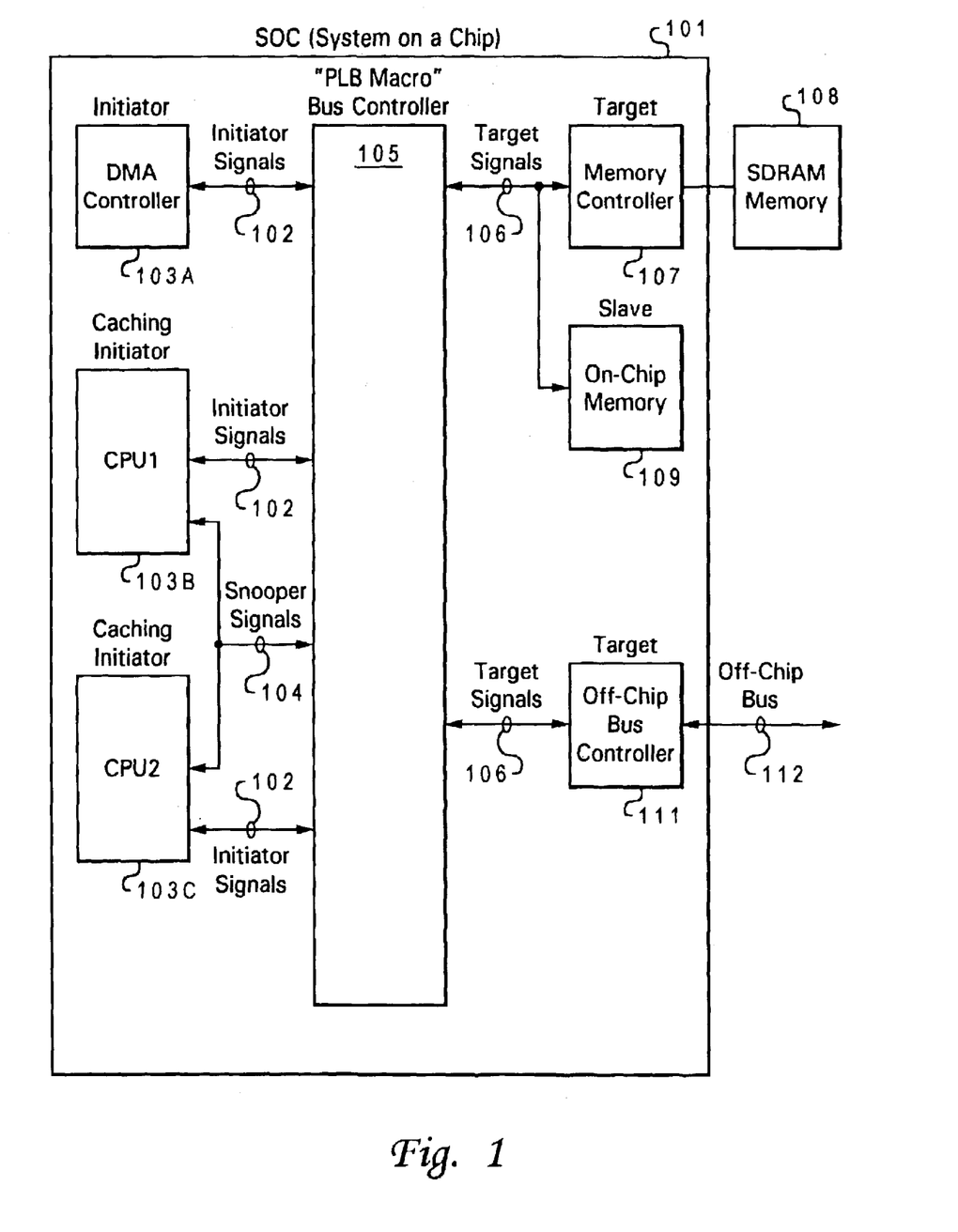
FIG. 1 is a block diagram illustrating major components of a system on a chip (SoC) within which the features of the present invention may advantageously be implemented.

In the illustrative embodiment, the computer system is a system-on-a-chip (SoC) having a PLB5 bus and PLB5 macro. FIG. 1 illustrates a SoC in which the features of the invention may be implemented. SoC 101 comprises several initiators, targets and the bus controller, all fabricated on the same chip (die).

As shown initiators include direct memory access (DMA) controller 103A and two embedded processor cores, CPU1 103B and CPU2 103C. Generated initiator signals 102 are sent between processor local bus (PLB) controller (PLB Macro) 105, which arbitrates and sends target signals 106 to their respective destination target. As shown, the destination targets is one of a memory controller (target) 107, which is coupled to and controls access to off-chip (i.e., external core to SoC) memory, such as SDRAM 108 (synchronous dynamic random access memory), an on-chip memory (target) 109, or an off-chip bus controller (target) 111. The latter target 111 has an associated off chip bus 112 by which it connects to off-chip components.

Figure 2:
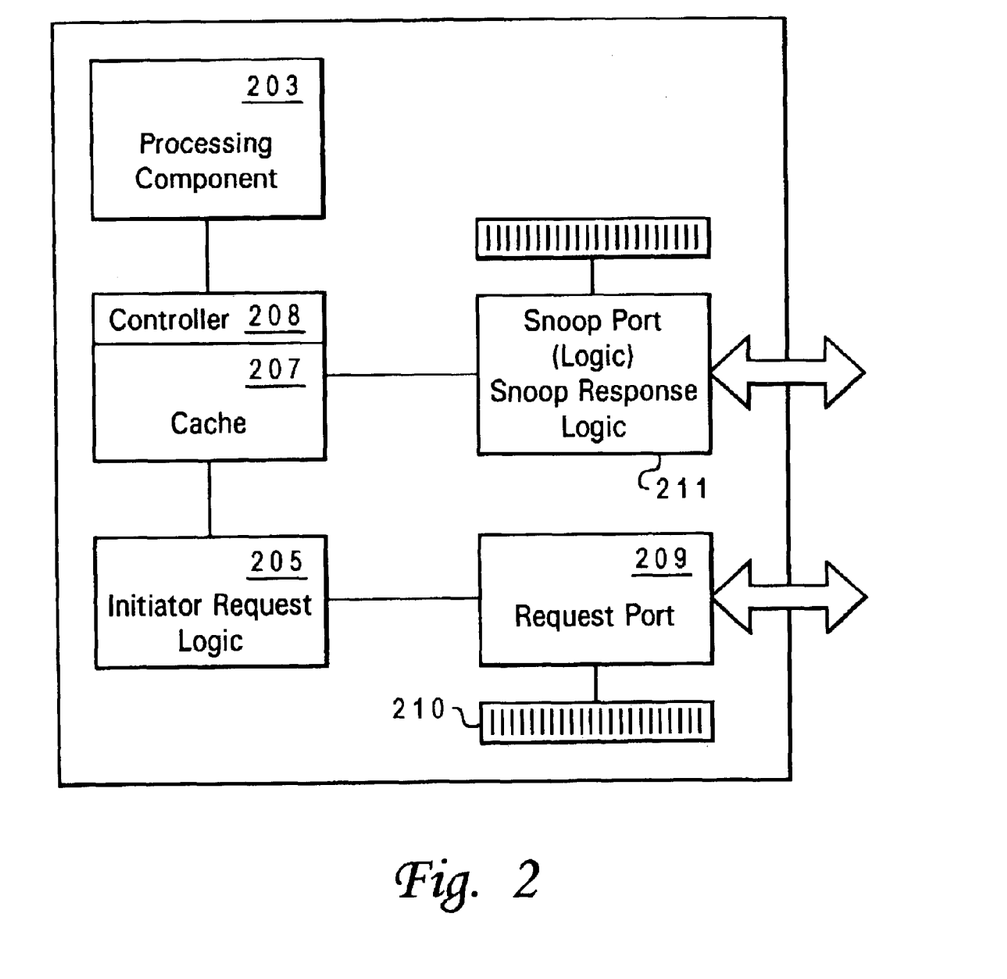
FIG. 2 is a block diagram representation of a cache initiator with logic for implementing the features of the present invention.

FIG. 2 illustrates a caching-initiator designed according to the present invention. Caching-initiator 201 includes a processing module 203 (although some caching initiators may in fact be a CPU) and initiator logic 205. Initiator logic 205 may be a sub-component of processing module 203, although illustrated as a separate component herein. Initiator logic 205 comprises snoop response logic by which the various operations of the present invention are controlled and implemented.

Also within caching-initiator 201 is cache 207 and corresponding cache controller 208. Cache 207 is utilized for holding duplicate contents of a target (e.g., memory). Cache controller 208 includes logic for controlling access to data within cache 207 and coherency states for maintaining system coherency for each line of data within cache 207. Finally, caching-initiator 201 includes a request-port for initiating/issuing requests, an associated request register 210 for tracking requests issued from the caching-initiator 201, and a snoop-port 211 for snooping the snoop requests issued by other initiators on the bus. During operation, when cache 207 of caching-initiator 201 includes a "modified" state, as a part of its cache coherency protocol, such as MESI, MEI or MOESI, then, in response to a snoopable request on the snoop-port 211 that hits a dirty (modified) location in cache 207, caching-initiator 201 retries the request and issues a snoop-push request on its request-port 209.

Figure 3:
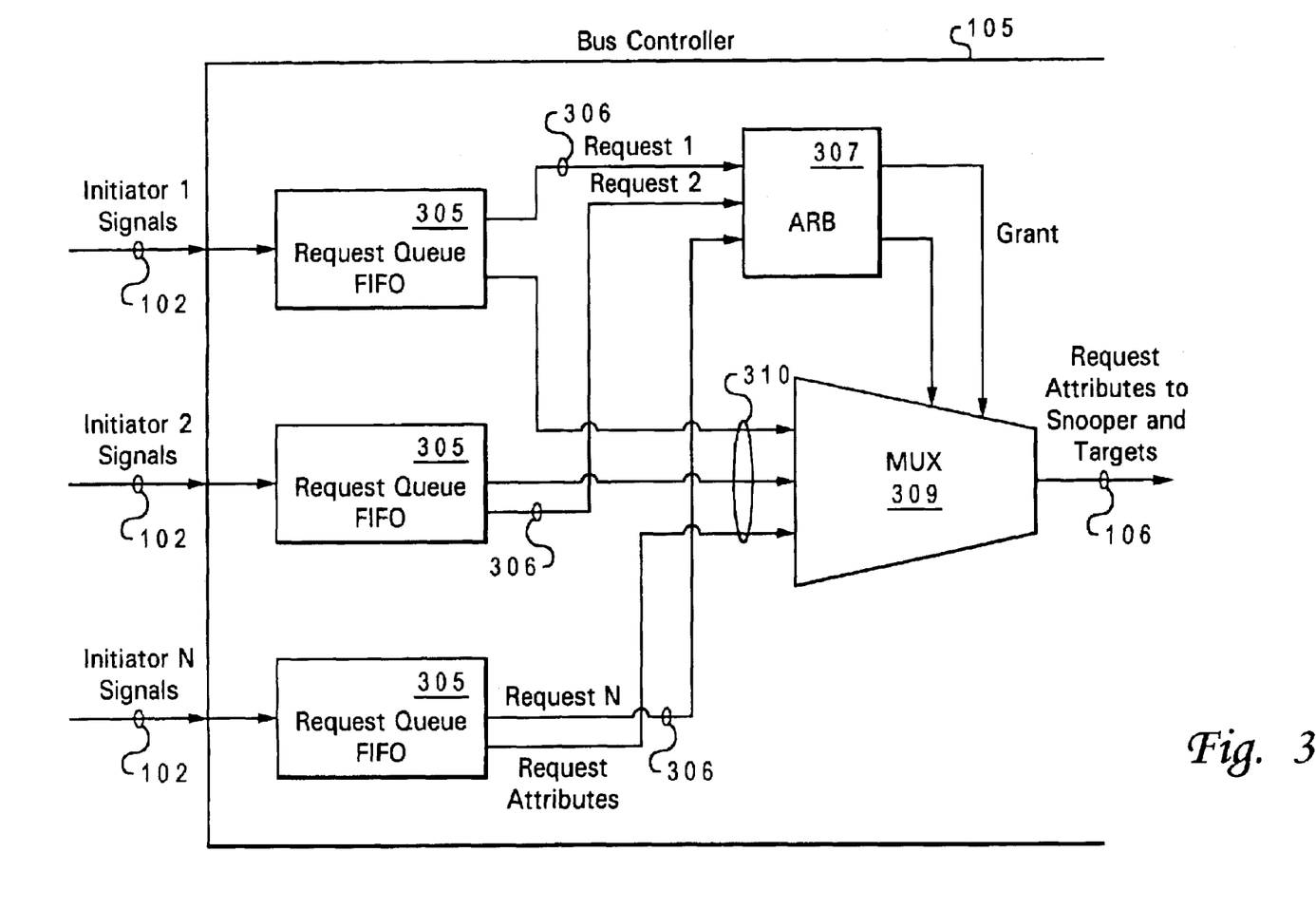
FIG. 3 is a block diagram of a bus controller of the SoC of FIG. 1, which controller handles the request grants, re-ordering and other features according to one implementation of the invention.

FIG. 3 illustrates a bus controller, within which several key processes features of the invention are implemented. Bus controller 105 consists of multiple First-In-First-Out (FIFO) request queues 305, which each receive a corresponding set of initiator input signals 102. There is one request queue for each initiator. Request queues 305 consist of several sequential registers/blocks (not shown) that each temporarily stores a request received from the corresponding caching initiator. The request remains within the request queue 305 until all request ahead of it in the request FIFO are granted. Requests are pipelined by the initiators into the respective request queues. This means that a new request is sent by the initiator before any response is received for previously sent requests. The FIFO structure of the request queue ensures that the transaction ordering intended by the initiator is maintained. This order is indicated by the order in which the initiator queues its requests. Request queue issues requests 306 to arbiter 307 in the order the requests were received from the initiator, which is also the order of placement within the request queue 305.

Bus controller 105 also includes an arbiter 307 and a multiplexer 309. Bus controller 105 further includes routing logic and miscellaneous buffering and registering logic (not shown). Each request queue sends its output (the oldest request) to the arbiter 307. Arbiter 307 selects which request is "granted" during a given period of time from among the pending requests from each of the request queues 305. Over multiple periods of time, all requests are granted. Multiplexer 309 receives the request selected by arbiter 307 and also an input of request attributes 310 and generates a single output 106, which includes the request attributes. This output 106 is sent to snoopers and targets. When a request is "granted", it is broadcasted to the snoopers and the targets via output 106.

Because of the FIFO structure of the request queue, when a request is granted, but then subsequently retried by the target or a snooper, the request remains on the "output" of FIFO 305. The request is later repeated when the arbiter 307 grants it again, without requiring any activity from the initiator.

When a caching-initiator has one or more requests pending and subsequently encounters a request on its snoop-port that causes it to make a snoop-push, it is often necessary for the snoop-push to be granted on the system bus before the requests that were already pending within request FIFO affiliated with that caching-initiator. This is because the already pending requests may also require other caching-initiators to make snoop-pushes. The invention as described below enables the system to maintain these completion dependencies and prevent deadlock, which may occur with other systems. The invention also enhances performance by ensuring that a caching-initiator completes its snoop-pushes as quickly as possible. The invention achieves these performance benefits by moving the snoop-push ahead of already pending requests, as is described below.

According to the illustrative embodiments, the caching-initiator/bus-controller interface is provided with a capability that allows the caching-initiator, upon recognizing the need to do a snoop-push, to send an indication (signal) to the bus-controller that causes the request FIFO of that caching-initiator to be reorganized such that when the snoop-push request(s) is sent to the bus controller, it is moved to the front of the request queue. Thus, two software methods are described to complete the re-organizing of the request FIFO to accommodate snoop-pushes. Another hardware-enabled way of completing this process of allowing the snoop-push to be given priority and completed prior to requests issued ahead of it from the initiator is also provided.

Figure 5:
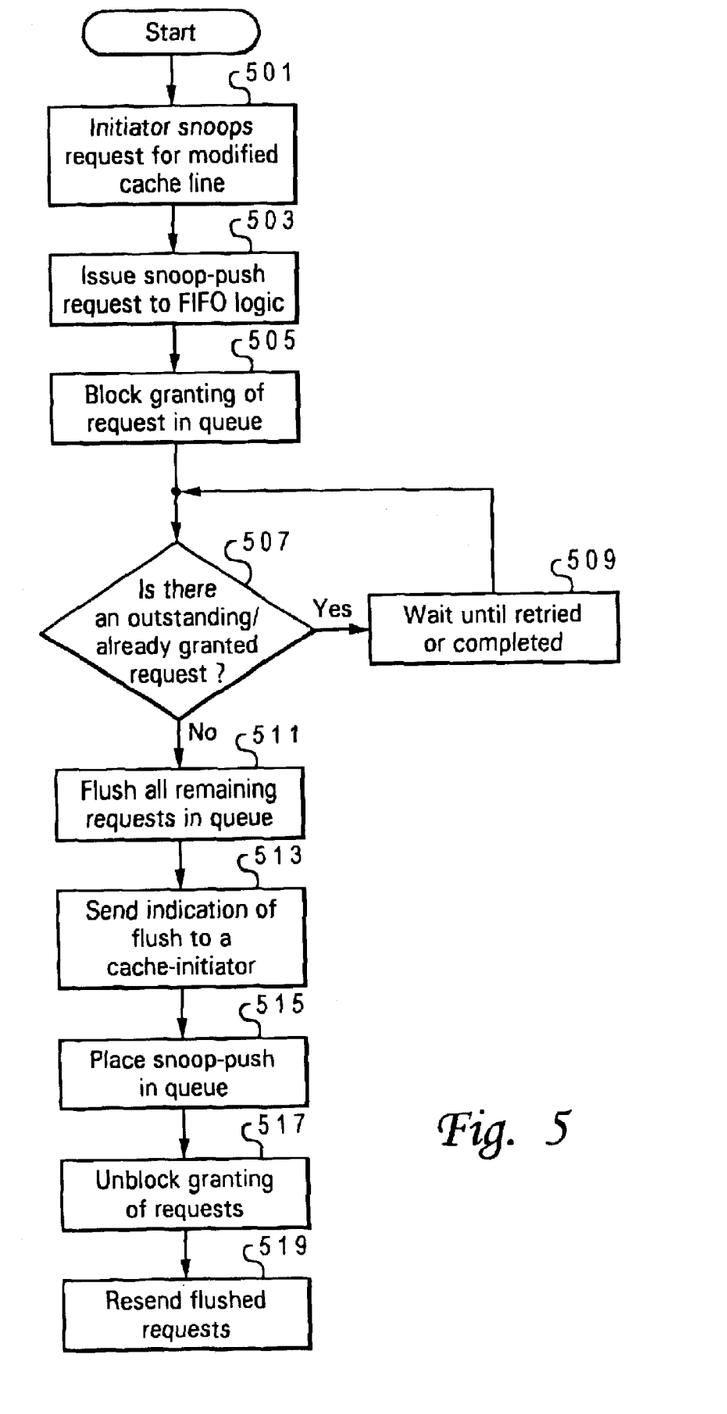
FIG. 5 is a flow chart of the process steps of postponing a request and initiating global flush of the request FIFO according to one implementation of the present invention.

The first of the two software-based methods is illustrated by the flow chart of FIG. 5. In this first embodiment, when the caching-initiator needs to move a snoop-push ahead of already pending requests, it asserts a signal, called "postpone-request", to indicate to the bus-controller (FIFO logic) that it should remove all requests that precede the assertion of postpone-request from the request queue. Thus, when the bus controller receives "postpone-request", the FIFO logic performs a "flushing sequence" described by the process steps in FIG. 5. The process begins when the initiator snoops a request for a modified cache line as shown at block 501. The postpone request signal is pulsed as shown in block 502. The initiator issues a snoop-push request to FIFO logic as shown at block 503. The FIFO logic is triggered to block granting all requests presently in the FIFO as indicated at block 505.

A determination is then made as shown at block 507, whether there are any already granted request pending (i.e., awaiting selection by the arbiter). One or more requests may already be granted at the time the bus-controller receives postpone-request signal, and the invention Blocks only the granting of (ungranted) requests still in the request FIFO. If there is a pending request, then the process waits until all already-granted requests are either retried or completed as shown at block 509. As each pending request completes, a completion indication is sent to the caching-initiator and the request is removed from the request queue (regardless of the assertion of "postpone request").

Following the completion of the pending requests, all remaining requests received before the assertion of postpone-request are flushed from the request queue as indicated at block 511. An indication of the completion of the flush is sent to the caching-initiator as indicated at block 513, and the snoop-push is placed in the request FIFO as shown at block 515. With no other requests in the request FIFO, the snoop-push takes the first position within the queue and will necessarily be the next request issued from that FIFO to the arbiter for completion according to standard FIFO processing. The indication of the occurrence of flushing is sent to the caching-initiator so that the caching-indicator is made aware of the "flushed" state of the request queue. In the illustrative embodiment, this is implemented with a signal called "postpone-acknowledge", which may be asserted once for each request that is flushed (if caching-initiator tracks each individual request still pending within a local register, for example). Alternatively, "postpone-acknowledge" may be asserted only once for all flushed requests. Then, the granting of requests from the FIFO is unblocked as shown at block 517 and normal FIFO-based issuance of requests is resumed.

The "flushing sequence" removes all pending requests that were in the request queue ahead of the snoop-push(es), so that the snoop-push(es) are next to run. For optimal performance, the caching-initiator can send the snoop-push(es) immediately after asserting postpone-request, even before receiving postpone-acknowledge (as long as there is room in the request queue) since only requests received before postpone-request are flushed. Once the snoop-push(es) are sent out of the FIFO to the arbiter, the caching-initiator re-sends the flushed requests as indicated at block 519.

Figure 4:
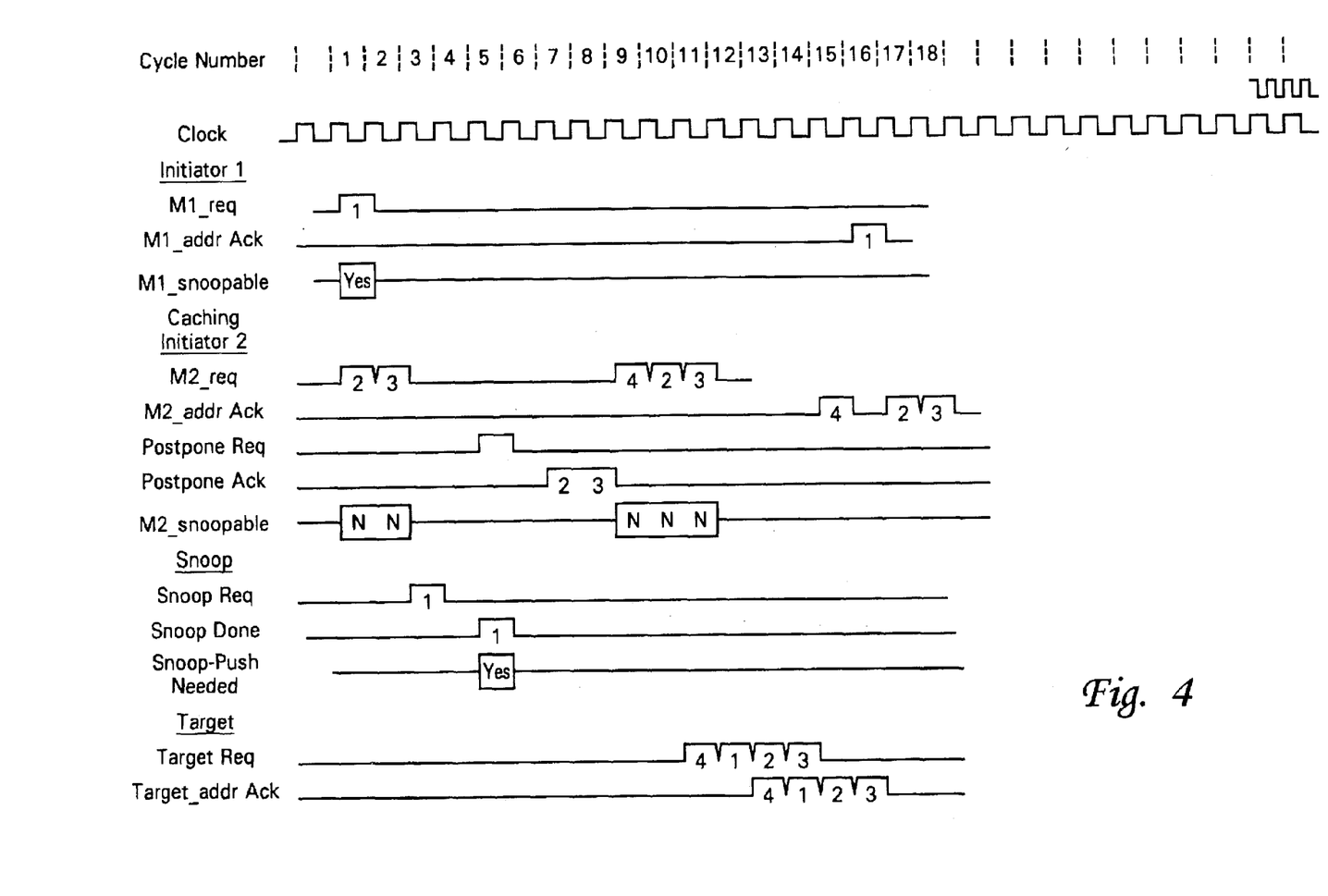
FIG. 4 is a timing diagram indicating the clock cycles at which processing of snoop-pushes and related functional processes occur for an example set of requests according to one embodiment of the invention.

FIG. 4 is a timing diagram that illustrates an example of an SoC with two Initiators of which the 2 nd is a caching initiator. The waveform shows only a subset of the signals on the bus. In particular, the waveform shows some of the control signals associated with the request/address tenures. In the illustrated embodiment, "req" is request, "addrAck" is address acknowledge, which indicates completion of a request, "targ_addrAck" is target address acknowledge. The timing diagram is completed according to the first embodiment illustrated at FIG. 5.

As illustrated, initiator1 makes "snoopable" request1 in cycle 1, and Initiator2 makes non-snoopable request2 in cycle 1 and non-snoopable request3 in cycle2. The arbiter first grants request1, which is broadcasted to the snoopers (caching initiator2) on cycle 3. Caching initiator2 needs to do a snoop-push before request1 can proceed, as indicated at cycle5. Therefore, caching intiator2 asserts postponeReq to request that bus controller clear out request FIFO. In response, the bus controller asserts postponeAck in cycle 7 and 8 to clear out request2 and request3. Caching initiator2 makes request4 in cycle 9, which is the snoop-push. Caching initiator2 then repeats request2 and request3. Request4 is passed to the target on cycle 11 and request1 is then passed to the target on cycle 12.

In another implementation, request 1 is forwarded to the target at the same time it is broadcasted to the snoopers (cycle 3), but request1 is aborted to the target when snoop-push needed is detected in cycle 5. The snoop-push (request4) ensures that it is safe to run. Request2 and request3 are then passed to the target on cycle 13 and 14.

Figure 6:
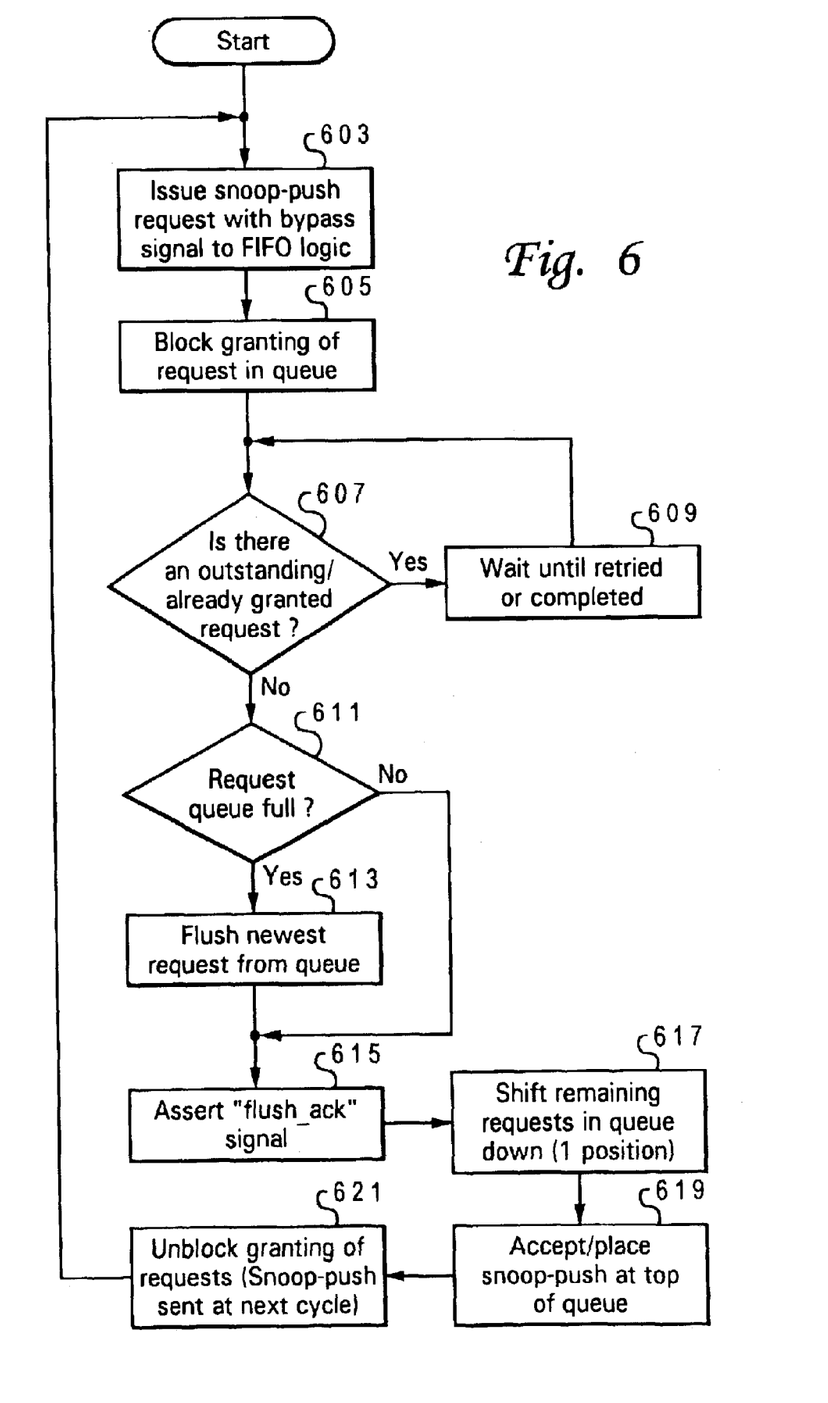
FIG. 6 is a flow chart of the process steps of postponing a request and initiating request by-pass within the request FIFO according to one implementation of the present invention.

FIG. 6 illustrates a second (software-enabled) embodiment of the process by which the snoop-push is placed in the FIFO to be issued ahead of pending requests. The second embodiment involves moving the snoop-push ahead of the other requests in the FIFO rather then flushing the entire contents of the FIFO. The process begins similarly to that illustrated by FIG. 5 where the granting of requests in the FIFO is blocked (605) following receipt of a snoop-push. However, in this embodiment, the snoop push is issued along with a bypass signal as shown at block 603.

In this embodiment, the caching-initiator moves a snoop-push ahead of already pending requests. This is completed by sending the snoop-push(es) and simultaneously asserting a signal called "bypass-enable". The "bypass-enable" signal indicates to the bus-controller (FIFO logic) that the associated snoop-push request should be moved to the front of the request queue, which may require flushing the newest (bottom most) request to make room for the new snoop-push request. When the bus controller receives a snoop-push request with "bypass-enable" asserted, the FIFO logic performs the bypass sequence.

Returning now to FIG. 6 and the description thereof. The bypass sequence involves first block the granting of (un-granted) requests pending in the request queue as indicated at block 605. However, as described above, the process determines whether there are outstanding/pending requests at block 607 and waits until already-granted requests (i.e., requests sent to the arbiter from the request FIFO) are either retried or completed as shown at block 609. As above, one or more requests may already be granted at the time the bus-controller receives "postpone-request". If a pending request is completed, then a completion indication is sent to the caching-initiator and the request is removed from the request queue regardless of the assertion of bypass-enable. In this embodiment, a separate "bypass-enabled" and "postpone request" signals are provided. However, the invention may be implemented with a single "bypass enabled" signal, which has both the functionality of bypass and of the "postpone request" associated therewith.

After blocking the other requests in the FIFO and all outstanding/already granted requests are completed or retried, a next determination is made at block 611, whether the request FIFO is full. If the FIFO is full, the last/newest request placed in the FIFO is flushed as shown at block 613. The caching-initiator is provided with an indication of the flush operation by asserting a signal called "flush-acknowledge" as indicated at block 615. The remaining requests within the FIFO are shifted down 1 position in the FIFO as indicated at block 617 and the snoop-push request is inserted at the top/front of the queue as shown at block 619. The granting of requests from the FIFO is then unblocked as indicated at block 621.

The bypass sequence moves the snoop-push to the front of the request queue so that it can run next. Since the snoop-push request is at the top of the request FIFO it is the first request issued from the queue to the arbiter. If a request queue entry is flushed, as indicated by the assertion of flush-acknowledge, then the caching-initiator re-sends the flushed request at a later time. According to one other embodiment, if a next snoop push is received before the first snoop push inserted in the request FIFO is granted, the next snoop push is inserted sequentially after the first snoop push in the request FIFO.

According to one embodiment, the snoop-push request is stored in a temporary location while waiting to be placed in the request FIFO. Where the request FIFO has available spaces in the first software embodiment, the snoop-request may be placed at the bottom of the queue and tagged. When the flush operation is carried out, only the untagged requests (i.e., all requests except the snoop-request) within the FIFO are flushed. Notably, the reverse process also applies where the older requests are tagged and the snoop un-tagged and the flush operation flushes only the tagged requests. Exact location of a holding mechanism to temporarily store the snoop-push request is dependent solely on the ability of the cache-initiator logic and/or bus controller (FIFO) logic to store, locate, and later move the snoop-request into the front of the FIFO when that FIFO location is clear.

Figure 7A:
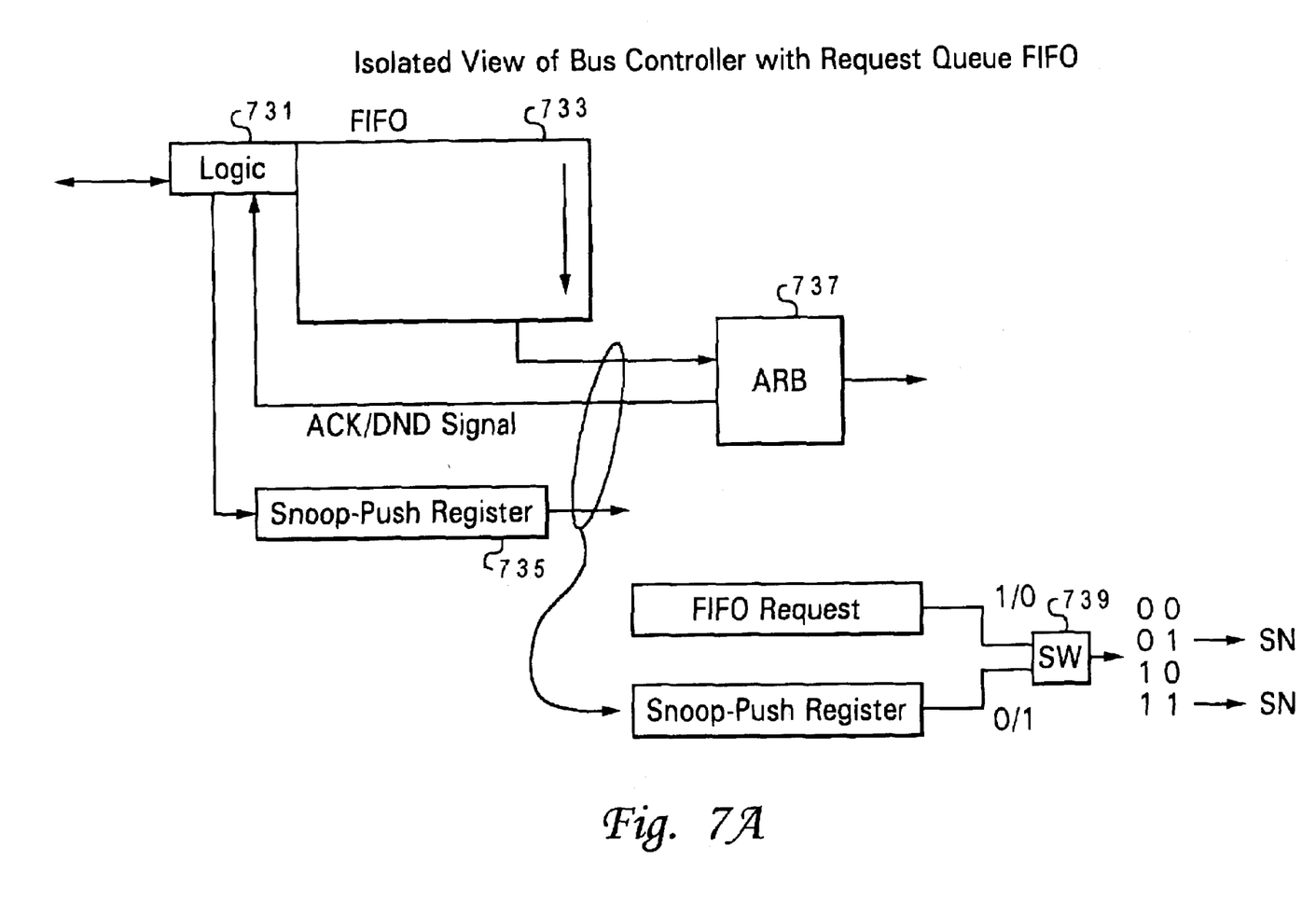
FIG. 7A illustrates an isolated FIFO with request FIFO and separate register for holding a snoop-push request according to one embodiment of the present invention.
Figure 7B:
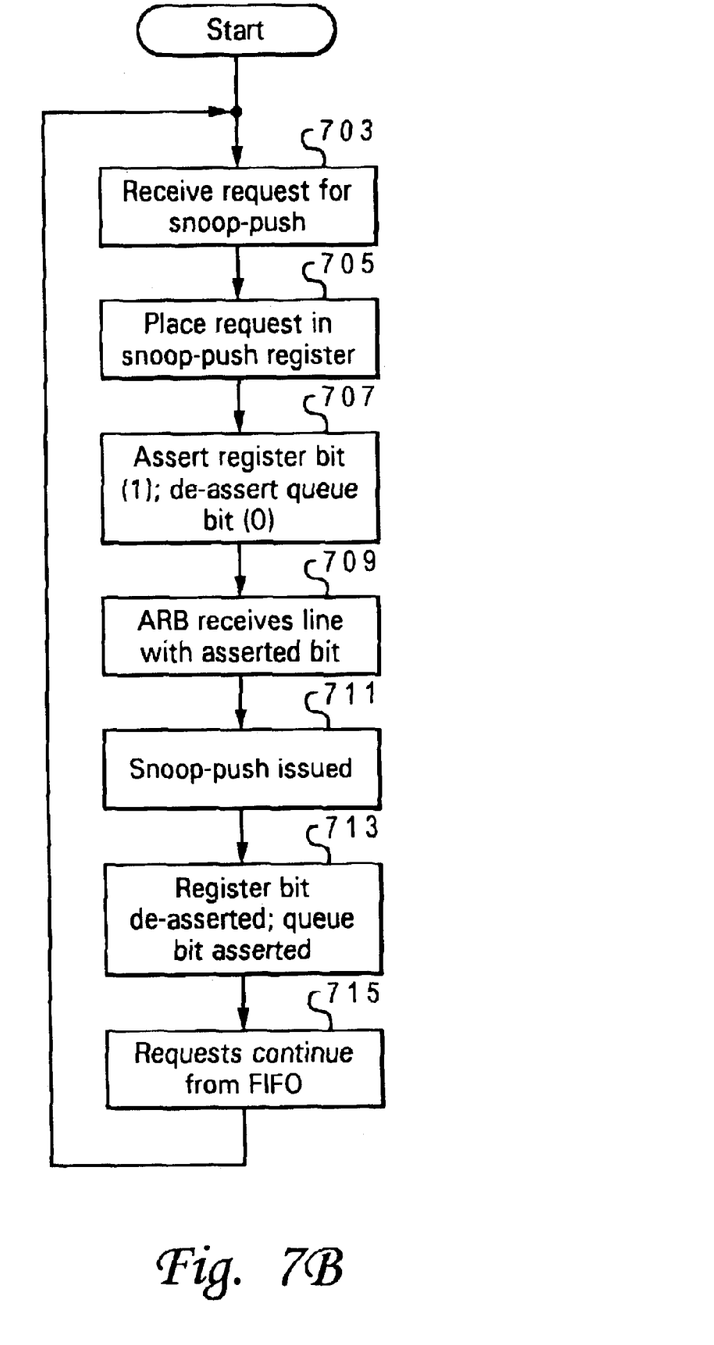
FIG. 7B is a flow chart of the process of immediately issuing a snoop-push from a register without postponing requests within the request FIFO according to one embodiment of the invention.

One extension of this embodiment involves providing a snoop-request register and logic to complete an override of the FIFO. This hardware-based configuration and process are illustrated in FIGS. 7A and 7B. It is noted however, that to improve performance and minimize logic area, the request FIFO must be able to contain multiple snoop pushes without including additional request storage separate from the FIFO. Thus, the above described methods represent the primary implementation of the features of the invention.

FIG. 7A illustrates a hardware configuration of a single FIFO of the bus controller designed to complete a FIFO override process according to a different embodiment of the invention. As described above, in addition to request FIFO 733 and associated FIFO logic 731, a single snoop-push register 735 is provided to temporarily hold a snoop push request received at the FIFO from a caching-initiator. According to the first and second software-based embodiments, the snoop push request is stored in snoop push register 735 until the flushing operation (of all requests or the last/newest request) from the FIFO is completed and is acknowledged. Then, the snoop-push request is moved from snoop push register 735 and placed in request FIFO 733. Notably, only a snoop-push request may be stored within snoop-push register 735 and logic 731 ensures that this feature is not breached. Also, the entire operation is completed within the bus controller and not within the initiator. This enables concurrent processing of multiple snoop pushes and eliminates the timing penalty associated with other hardware based methods.

In the hardware embodiment, output bus of snoop push register 735 and request FIFO 733 are both provided to arbiter 737 through switch 739. Switch 739 enables only a single output from either component to be sent to arbiter. That is, whenever an output from snoop request register 735 is asserted (e.g., a high signal (1) placed on the bus, switch automatically blocks the FIFO requests until the snoop-request register's signal line is de-asserted. Thus, as soon as snoop-push register 735 becomes full (i.e., holding a snoop-push request), register's output signal line is asserted, FIFO's output signal line is de-asserted and subsequently FIFO issuance of requests is suspended until snoop-request queue 735 has issued the snoop-push request. This operation/process is illustrated by FIG. 7B. Notably, this implementation may operate without the software provided signaling to the caching-initiator and FIFO as described in the software-enabled embodiments.

FIG. 7B illustrates the hardware only process. The process starts when a snoop-push request is received at the FIFO as shown at block 703. The snoop-push request is immediately placed in the snoop-push register as indicated at block 705. The required register/switch bit is asserted so that the FIFO logic knows to suspend FIFO issuance of requests as indicated at block 707. The snoop request register is then provided access to the arbiter as shown at block 709, and the snoop push is issued at some later cycle as indicated at block 711. Following the issuance of the snoop-push from the register, the register/switch bit is de-asserted as indicated at block 713, and the FIFO logic resumes issuing requests from request FIFO as shown at block 715.

As stated above, utilization of the two software-based implementations is preferred over the hardware based method primarily because the hardware method requires additional hardware registers (and more register area) within the request FIFO (or bus controller) to support multiple snoop pushes. With the software-based implementation, the multiple snoop pushes are placed within the request FIFO without requiring the additional registers and use of the limited real estate on the chip.

As a final matter, although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for prioritizing snoop pushes in a data processing system that schedules requests within a request FIFO having a top position at which requests are granted and a bottom position at which requests are entered, said method comprising:

placing a generated request into the bottom position of a request FIFO, wherein said request FIFO grants request based solely on the order within the request FIFO and sequentially moves requests closer to the top position as prior requests are granted; and when a snoop push is received at said request FIFO, automatically inserting said snoop push at the top position of said request FIFO ahead of all ungranted request within the request FIFO.

2. The method of claim 1, wherein said automatically inserting step comprises:

temporarily suspending a grant of a next ungranted request scheduled to be granted when a prior grant request completes;

moving each request back one spot within the request FIFO;

inserting said snoop push in the spot vacated by said next ungranted request; and resuming normal operation of the request FIFO.

3. The method of claim 2, further comprising temporarily storing said snoop push in a register while said moving step is being completed.

4. The method of claim 2, further comprising:

when the request FIFO is full prior to receipt of said snoop push, removing a last request from the FIFO; and messaging a device that generated said last request to reissue said last request at a later time.

5. The method of claim 2, wherein if a next snoop push is received before the snoop push inserted in the request FIFO is granted, said method comprises inserting said next snoop push sequentially after the snoop push in the request FIFO.

6. The method of claim 1, further comprising:

determining whether a first request in the top position in said quest FIFO has been granted;

when said first request has been granted, temporarily storing said snoop push in a register;

automatically placing said snoop push in the top position when said first request completes and is removed from the request FIFO.

7. The method of claim 6, further comprising:

monitoring a response path for said first requests; and when a retry is seen on said response path, automatically re-ordering said first request within the request FIFO and placing said snoop push in the top position.

8. A data processing system comprising:

an initiator that generates and issues requests and snoop pushes to a target;

a bus controller interconnecting said initiator and target;

means for scheduling requests received from said initiator, wherein said requests are scheduled and granted sequentially in the order received; and wherein, when a request for a stoop push is received, said means for scheduling automatically places the snoop push ahead of all pending requests, whereby said snoop push request is granted before the other pending requests.

9. The data processing system of claim 8, wherein said means for scheduling is a component of said bus controller and includes a request FIFO and FIFO logic.

10. The data processing system of claim 9, wherein said FIFO logic includes means for monitoring received requests for said snoop push request.

11. The data processing system of claim 10, wherein said FIFO logic further comprises means for:

temporarily suspending a grant of a next request scheduled to be granted when a prior request that was previously granted completes;

moving said next request and all later requests back one spot within the request FIFO;

inserting said snoop push in the spot vacated by said next request; and resuming normal operation of the request FIFO.

12. The data processing system of claim 11, wherein further:

said means for scheduling includes a snoop push register; and said FIFO logic comprises logic means for temporarily storing said snoop push in said register while said moving step is being completed.

13. The data processing system of claim 12, wherein said FIFO logic further comprises means for:

when the request FIFO is full prior to receipt of said snoop push, removing a last entered request from the FIFO; and messaging a device tat generated said last entered request to reissue said last entered request at a later time.

14. The data processing system of claim 10, wherein said FIFO logic further comprises logic for inserting a next snoop push sequentially after the first snoop push in the request FIFO when the next snoop push is received before the first snoop push inserted in the request FIFO is granted.

15. The data processing system of claim 8, further comprising:

a target to which said requests are directed; and a snooper that responds to a snoop push request.

16. The data processing system of claim 8, wherein said data processing system is a system on a chip (SoC).

17. The data processing system of claim 8, further comprising:

means for determining whether a first request in a top position in said request FIFO has been granted;

means for when said first request has been granted, temporarily storing said snoop push in a register;

means for automatically placing said snoop push in the top position when said first request completes and is removed from the request FIFO.

18. The data processing system of claim 17, further comprising:

means for monitoring a response path for said first request; and means for when a retry is seen on said response path, automatically re-ordering said first request within the request FIFO and placing said snoop push in the top position.

19. A system on a chip (SoC) comprising:

an initiator that generates and issues requests and snoop pushes to a target;

a bus controller interconnecting said initiator and said target;

means for scheduling requests received from said initiator, wherein said requests are scheduled and granted sequentially in the order received; and wherein, when a request for a snoop push is received, said means for scheduling automatically places the snoop push ahead of all pending requests, whereby said snoop push request is granted before the pending requests.

20. The system on a chip (SoC) of claim 19, wherein said means for scheduling is a component of said bus controller and includes a request FIFO and FIFO logic.

21. The system on chip (SoC) of claim 20, wherein said FIFO logic includes logic means for monitoring received requests for said snoop push request.

22. The system on a chip (SoC) of claim 21, wherein said FIFO logic further comprises means for:

temporarily suspending a grant of a next request scheduled to be granted when a prior request that was previously granted completes;

moving said next request and all later requests back one spot within the request FIFO;

inserting said snoop push in the spot vacated by said next request; and resuming normal operation of the request FIFO.

23. The system on a chip (SoC) of claim 22, wherein further:

said means for scheduling includes a snoop push register; and said FIFO logic comprises means for temporarily storing said snoop push in said register while said moving step is being completed.

24. The system on a chip (SoC) of claim 23, wherein said FIFO logic further comprises means for:

when the request FIFO is full prior to receipt of said snoop push, removing a last request from the FIFO; and messaging a device that generated said last request to reissue said last request at a later time.

25. The system on a chip (SoC) of claim 21, wherein said snoop push is a first snoop push of multiple snoop pushes and said FIFO logic further comprises logic for inserting a next snoop push sequentially after the first snoop push in the request FIFO when the next snoop push is received before the first snoop push inserted in the request FIFO is granted.

26. The system on a chip of claim 19, further comprising:

means for determining whether a first request in a top position in said request FIFO has been granted;

means for when said first request has been granted, temporarily storing said snoop push in a register;

means for automatically placing said snoop push in the top position when said first request completes and is removed from the request FIFO.

27. The system on a chip of claim 26, further comprising:

means for monitoring a response path for said first request; and means for automatically re-ordering said first request within the request FIFO and placing said snoop push in the top position, when a retry is seen on said response path.

* * * * *

UNITED STATES PATENT AND TRADEMARK OFFICE
CERTIFICATE OF CORRECTION

PATENT NO. : 6,907,502 B2  
APPLICATION NO. : 10/264169  
DATED : June 14, 2005  
INVENTOR(S) : Augsburg et al.

Page 1 of 1

It is certified that error appears in the above-identified patent and that said Letters Patent is hereby corrected as shown below:

In Claim 6, at column 10, line 10, delete "quest" and insert --request--.

In Claim 13, at column 10, line 61, delete "tat" and insert --that--.

In Claim 21, at column 11 line 42, between "on" and "chip" insert --a--.

Signed and Sealed this

Eleventh Day of July, 2006

JON W. DUDAS  
*Director of the United States Patent and Trademark Office*